US008062681B2

(12) United States Patent
Kapila et al.

(10) Patent No.: US 8,062,681 B2
(45) Date of Patent: Nov. 22, 2011

(54) AMINO ACID OLIGOMER DIETARY SUPPLEMENT

(75) Inventors: Shubhen Kapila, Rolla, MO (US); Monty S. Kerley, Columbia, MO (US)

(73) Assignee: The Curators Of The University Of Missouri, Columbia, MO (US)

( * ) Notice: Subject to any disclaimer, the term of this patent is extended or adjusted under 35 U.S.C. 154(b) by 1034 days.

(21) Appl. No.: 11/843,534

(22) Filed: Aug. 22, 2007

(65) Prior Publication Data

US 2008/0085339 A1    Apr. 10, 2008

Related U.S. Application Data

(60) Provisional application No. 60/839,381, filed on Aug. 22, 2006.

(51) Int. Cl.
*A23L 1/20* (2006.01)

(52) U.S. Cl. ............ 426/2; 426/231; 426/630; 426/635; 426/641; 426/656

(58) Field of Classification Search .............. 426/2, 231, 426/630, 635, 641, 656
See application file for complete search history.

(56) References Cited

U.S. PATENT DOCUMENTS

| | | | |
|---|---|---|---|
| 4,701,328 | A | 10/1987 | Bercovici et al. |
| 5,167,957 | A | 12/1992 | Webb, Jr. et al. |
| 5,631,031 | A | 5/1997 | Meade |
| 6,605,590 | B1 | 8/2003 | Lorbert et al. |
| 2003/0143661 | A1 | 7/2003 | Lorbert et al. |
| 2004/0170669 | A1 | 9/2004 | Kunkle et al. |

OTHER PUBLICATIONS

PCTUS2007076557, International Search Report and Written Opinion, Mailed Oct. 14, 2008, 19 pages.
Wallace, R.J., et al., Metabolism of Small Peptides in Rumen Fluid. Accumulation of Intermediates During Hydrolysis of Alanine Oligomers, and Comparison of Peptidolytic Activities of Bacteria and Protozoa, Journal of Science Food Agriculture, 1990, vol. 50, pp. 191-199.
Williams, A.P., and Cockburn, J.E., Effect of Slowly and Rapidly Degraded Protein Sources on the Concentrations of Amino Acids and Peptides in the Rumen of Steers, Journal of Science Food Agriculture, 1991, vol. 56, pp. 303-314.
Broderick, G.A. & Kang, J.H. "Automated Simultaneous Determination of Ammonia and Total Amino Acids in Ruminal Fluid and in Vitro Media"; 1980 J. Dairy Sci. 63 pp. 64-75.
Grigsby, K.N., Kerley, M.S., Paterson, J.A., and Weigel, J.C., "Site and Extend of Nutrient Digestion by Steers Fed a Low-Quality Bromegrass Hay Kiet with Incremental Levels of Soybean Hull Substitution"; Department of Animal Science, University of Missouri, 1992 J. Anim. Sci. pp. 1941-1949.
Schwab, C. G., Bozak, C.K., and Whitehouse, N. L, "Amino Acie Limitation and Flow to Duodenum at Four Stages of Lactation. 1) Sequence of Lysine and Methoinine Limitation"; 1992 J. Dairy Sci. 75 pp. 3486-3502.
Xu, S., Harrison, J.H., Chalupa, W., Sniffen, C., Julien, W., Sato, H., Fujieda, T., Watanabe, K., Ueda, T., and Suzuki, H. "The Effect of Ruminal Bypass Lysine and Methionine on Mild Yeild and Composition of Lactating Cows", 1998 J. Dairy Sci. 81 pp. 1602-1077.
Wu, Z., Fisher, R.J., Polan, C.E., and Schwab, C.G., "Lactational Performance of Cows Fed Low or high Ruminally Undergradable Protein Prepartum and Supplemental Methionine and Lysine Postpartum" 1998 J. Dairy Sci. 80 pp. 722-729.
Noftsger, S., St. Pierre, N.R., Sylvester, J.T., "Determination of Rumen Degradability and Ruminal Effects of Three Sources of Methionine in Lactating Cows" 2005 J. Dairy Sci. 88 pp. 223-237.
Meng, Q., Kerley, M.S., Ludden, P.A., and Belyea, R.L. "Fermentation Substrate and Dilution Rate Interact to Affect Microbial Growth and Efficiency" 1999 J. Anim. Sci. pp. 206-214.
Zinn, R.A., and Owens, F.N. "A Rapid Procudure for Purine Measurement and Its Use For Estimating Net Ruminal Protein Synthesis" J. Anim. Sci. pp. 157-166.
PCT/US07/076557 Invitation to Pay Additional Fees and Communication Relating to the Results of the Partial International Search Report; mailed Apr. 9, 2008.
Gaertner, H.F. et al.; Covalent Attachment of Poly(L-Methionine) to Food Proteins for Nutritional and Functional Improvement; J. Agric. Food Chem., vol. 32 No. 6, 1984, pp. 1371-1376.

*Primary Examiner* — Anthony Weier
(74) *Attorney, Agent, or Firm* — Lathrop & Gage LLP

(57) ABSTRACT

A method for supplementing the levels of select amino acids in ruminants is provided. Amino acids are susceptible to microbial degradation in the rumen, where the relative susceptibility of an amino acid oligomer is determined primarily by its solubility in the rumen fluid. A method for designing and preparing microbial resistant amino acid oligomers based on relative solubility is also provided. Various compositions containing amino acids are described and shown to resist microbial degradation in ruminants.

43 Claims, 4 Drawing Sheets

Met Residue

N-terminal            C-terminal

HMB Residue

N-terminal            C-terminal

AMINO ACID OLIGOMER DIETARY SUPPLEMENT

This application claims priority to U.S. provisional patent application Ser. No. 60/839,381 filed on Aug. 22, 2006.

SEQUENCE LISTING

This application is accompanied by a sequence listing that accurately reproduces the sequences described herein.

BACKGROUND

I. Field of the Invention

The present invention relates to a method for the selection, preparation and use of oligomers that contain amino acids, and to compositions containing such oligomers. More specifically, the oligomers contain amino acid sequences that are less susceptible to microbial degradation in the rumen as compared to naturally occurring amino acid sequences, and so may be used for supplementing important nutrients to the animals. Moreover, the process disclosed herein may be used to design therapeutic peptides that can complement microbial protein synthesis in the rumen.

II. Description of the Related Art

Ruminants are animals that possess a complex stomach consisting of four morphologically distinct compartments. These compartments are rumen, reticulum, omasum and abomasum. The rumen and the reticulum are fermentation compartments where many species of microorganisms live. Digestion of the feed is conducted primarily by cellulase, amylase, cellobiose, and proteinases which the microflora secrete in the rumen and the reticulum.

One major problem associated with ruminant digestion is that substantial amounts of proteins and amino acids are hydrolyzed and fermented into ammonia and carbon dioxide by the resident microflora of the rumen. This microbial action renders significant amounts of biologically active peptides unavailable for animal absorption. Moreover, dietary supplements that contain essential amino acids are extensively degraded. This degradation renders the supplemented essential amino acids unavailable to the animals. The microbial action also generates excess nitrogen that the ruminants have to dispose of, burdening the secretion system of the animals and contributing to waste disposal problems, especially in high density industrial feeding operations.

Studies have been conducted in search for methods that can effectively protect peptides or amino acids from degradation. One approach has been to modify the peptide or amino acid materials by physical or chemical methods making the materials less susceptible to microbial degradation. In one example, heating soybean meal has been shown to help alleviate the degradation of proteins by microorganisms; however, the parameters of the heating process are difficult to control in order to obtain reliable and repeatable results. Insufficient heating may lead to no protection from degradation, while overheating may cause undesirable biological and/or chemical changes to the peptides or amino acids. Another method includes coating of peptides with shielding materials, such as fat. The coating procedures are tedious, and the side-effects of shielding materials on the body and on the peptides have significantly limited this concept in application. To date, no shielding technologies have proven stable when subjected to feed pelleting procedures.

Yet another approach is to react the amino acid or peptide materials with substituents that render the materials less susceptible to degradation. U.S. Pat. No. 6,605,590 issued to Lorbeit et al. discloses a process for attaching a residue of an α-hydroxy carboxylic acid (e.g., 2-hydroxy-4-(methylthio) butynoic acid ("HMB") to the end of an amino acid oligomer. The oligomers end-capped by HMB demonstrate reduced cleavage by a variety of proteases, but suffer a disadvantage that the α-hydroxy carboxylic acid may alter the chemical and/or biological characteristics of the peptide. For instance, HMB-poly-lysine is not digested by many proteases that otherwise digest lysine oligomer in the intestine, and so the HMB substitution defeats the purpose of rendering such materials available for adsorption in the intestines. There remains a need for a method of designing and selecting for amino acid oligomers that are resistant to microbial degradation in the rumen but are digestible in the intestine.

Although the HMB-capped oligomers disclosed in U.S. Pat. No. 6,605,590 appear to resist protease degradation in vitro, it is not known whether these oligomers are resistant to microbial degradation in the rumen in vivo. Indeed, experiments on degradation of methionine analogs, such as HMB-methionine, have produced conflicting results. While some studies have concluded that HMB is mostly resistant to microbial degradation, others have shown that merely 5.3% of HMB consumed escapes rumen degradation to reach the omasum. See e.g., Determination of rumen degradability and ruminal effects of three sources of methionine in lactating cows, S. Noftsger et al., J Dairy Sci. 2005 January; 88(1):223-37. Therefore, there is a need for a method to generate amino acid oligomers that can sustain microbial degradation in vivo.

SUMMARY

The present instrumentalities overcome the problems described above and advance the art by providing a method to prepare amino acid oligomers that are relatively resistant to microbial degradation in the rumen. This may be accomplished without chemical substitutions to stabilize amino acid residues or the use of amino acid analogs, such as HMB. This is possible because, as is now shown, the susceptibility of an amino acid oligomer to ruminant degradation is determined primarily by the solubility of the oligomer in the rumen fluid. Insoluble oligomers have improved rumen survivability, and so provide greater nutritional benefit to the ruminant animal. This survivability differs from chemical stability that is imparted by chemical reactions that substitute moieties on individual amino acids, but is compatible with and may be used in combination with chemical substitution methods. This is especially the case for apolar substitutions or other substitutions that decrease solubility. This discovery makes possible a more economical system of supplementing ruminant diets because feeds may be designed to provide less total supplementation while achieving the same or an improved dietary effect in the ruminant animal.

A new method is hereby disclosed by which oligomers resistant to ruminant degradation may be intelligently designed and prepared. Because the rumen fluid is largely water based, solubility in water is the primary consideration in designing the amino acid oligomers. Another major factor to be considered in selecting amino acid substituents is the nutritional need of the animals. Accordingly, oligomers may be designed based on their relative hydrophobicity and the amino acid composition of the oligomer may be designed based on the nutritional needs of the animals.

In one aspect, amino acid residues in peptides or oligomers may be selectively replaced by hydrophobic amino acids while maintaining the approximate ratio between essential amino acids. Oligomers thus generated may be tested to confirm their solubility in water or water-based solutions, while the content of specific amino acid residues is predetermined according to dietary needs of the animal, for example, as having a particular ratio of methionine to arginine. The oligomers that are substantially insoluble may be subjected to further tests for their relative resistance to microbial degradation in a fermentation system modeling the in vivo rumen environment. A high level of amino acid recovery after extended fermentation signifies high degree of resistance to microbial degradation. Oligomers capable of sustaining the fermentation are likely to deliver the highest level of amino acids for absorption by the ruminants. These oligomers are selected for feed preparation in order to test their susceptibility to degradation in the rumen of live animals.

In another aspect of the foregoing process, microbial resistant oligomers are selected that utilize naturally occurring amino acids. Unlike the HMB-capped oligomers, the oligomers according to the present invention are readily digestible and absorbable in the intestine. Moreover, the tedious process of end-capping an oligomer with α-hydroxy carboxylic acids is advantageously avoided.

In yet another aspect of this disclosure, a feed for ruminants contains a feed base and a synthetic component. The feed base may contain plant matter, animal matter, and combinations thereof. The feed base may be provided in either a naturally occurring form or a processed form. Naturally occurring forms of such materials reflect the amino acid content of a plant or animal as occurring in nature, for example, as silage, whole plants, grain, comminuted particles of plants or animals, stalk portions of plants, root portions of plants, and proteins that have been denatured by heating. Processed forms include, for example, plant or animal extracts as protein concentrates; waste products or byproducts of processing the natural forms, such as food processing plant wastes, fish processing wastes; and processing end products, such as pelletized animal feeds that contain the natural forms.

Typically, the feed base provides an amino acid content which includes essential amino acids in a ratio such that there exists a deficiency of at least one limiting essential amino acid. The limiting essential amino acid in the feed base is defined as an essential amino acid which is not present in sufficient amounts in the feed base or which is not normally adsorbed by a ruminant in an amount sufficient to achieve optimal efficiency in amino acid metabolism. The deficiency is ameliorated by supplementing a synthetic component including at least one oligomer containing α-amino acids in an amount as needed to at least partially offset the deficiency. The feed may be administered as a mixture of the feed base and the synthetic amino acid component, or by providing these materials separately in close physical proximity to one another.

In various aspects, the limiting essential amino acids may include lysine, methionine, histidine, threonine, isoleucine, leucine, tryptophan, valine, phenylalanine, arginine and combinations thereof. For example, the limiting essential amino acid component may be provided as polymethionine. Alternatively, the limiting essential amino acid content of the oligomer may be provided as a combination of methionine and lysine in a predetermined ratio, such as a ratio of methionine residues to lysine residues ranging from 1:2 to 1:6. This ratio is preferably about 1:2 or 1:5. In like manner, the limiting essential amino acid content of the synthetic component may be provided as a combination of methionine, lysine, histidine and arginine in a predetermined ratio, where a ratio of about 1:5:1:6 is preferred. Under certain circumstances, the limiting essential amino acid content of the synthetic component may be provided as a combination of methionine, lysine, histidine, threonine, leucine and arginine in a predetermined ratio, where a ratio of about 2:4:3:2:8:3 is preferred.

As described above, the amino acid sequence or sequences of the synthetic component are provided in a predetermined ratio to supplement the deficiency of essential amino acids in the feed base. In this respect the synthetic polypeptide (or amino acid oligomer) component is complementary to the feed base and is provided in a quantity that permits the ruminant to synthesize proteins more efficiently than would occur without such amino acid supplementation. The exact nature of the predetermined ratio may, accordingly, vary by design depending upon the amino acid content of the feed base and the nutritional requirements of a particular ruminant animal at various stages of growth. The improved metabolic efficiency may be demonstrated as improved weight gain in the ruminant animal over time, increased lactation by milk cow, lower costs of feeding the animal, improved conversion efficiency of feed to weight gain in the animal, intestinal availability of amino acids more consistent with protein-derived amino acids than crystalline amino acids, or as improved animal health and well being.

The particular sequence of amino acids in the oligomer is generally unimportant so long as a predetermined ratio of essential amino acids is preserved. Suitable sequences that have demonstrated rumen survivability according to the parameters described herein include, for example, in the non-limiting examples of SEQ ID NO. 1, SEQ ID NO. 2, SEQ ID NO. 3, SEQ ID NO. 4, SEQ ID NO. 5, SEQ ID NO. 6, SEQ ID NO. 7, SEQ ID NO. 8, SEQ ID NO. 9, SEQ ID NO. 10, SEQ ID NO. 11, SEQ ID NO. 12, SEQ ID NO. 13, SEQ ID NO. 14, SEQ ID NO. 15, SEQ ID NO. 16 and SEQ ID NO. 17.

The synthetic component may be provided in different ways. In one aspect, an oligomer sequence may contain all of the desired amino acids at the predetermined ratio in a single polypeptide chain. In another aspect, the synthetic component may be provided as a mixture of different oligomers. The former is exemplified by designing an amino acid oligomer with different amino acids selected from the group of limiting essential amino acids so that the ratio of different amino acids reflect the needs of the animals. Certain amino acids with high hydrophobicity index is deliberately inserted into the oligomer to render the oligomer less soluble and therefore more resistant to microbial degradation. The latter case is exemplified by the example of reacting a single amino acid monomer to form polymethionine, polyarginine, etc., to form a relatively insoluble oligomer chain. These different oligomers need not react with one another and may be provided as a mixture that forms the synthetic component. This former method of making the synthetic component is preferred especially when supplementing limiting essential amino acids that are polar or hydrophilic.

The dominant factors influencing solubility of a polypeptide oligomer are chain length and hydrophobicity of the amino acid residues that are used to form the oligomer. Solubility may generally be decreased by increasing the chain length; however, the use of hydrophilic residues may necessitate adding hydrophobic residues to achieve the requisite insolubility.

DETAILED DESCRIPTION OF THE INVENTION

Figure 1:
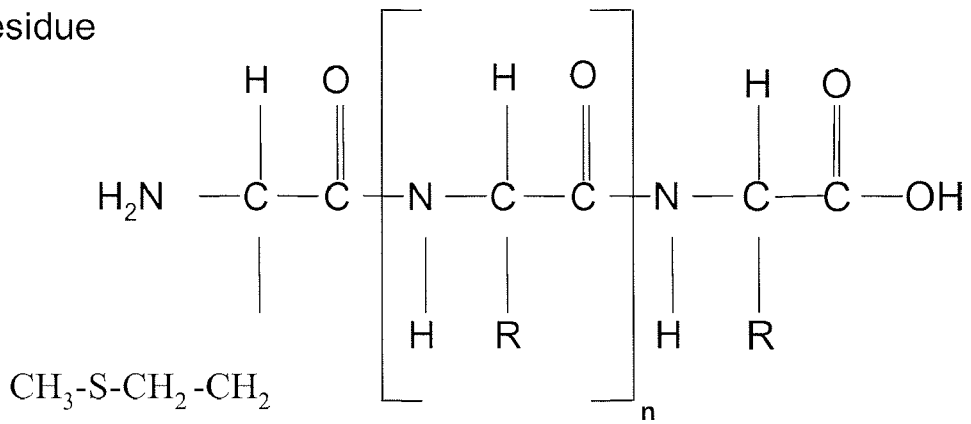
FIG. 1 is the general chemical structure of methionine oligomers and HMB capped methionine oligomer.
Figure 1:
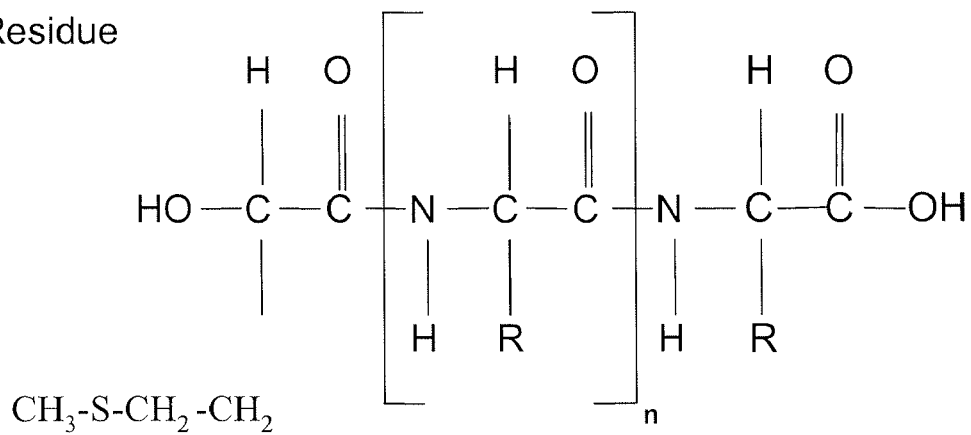

There will now be shown and described a method for producing amino acid oligomers that mitigate microbial degradation in the rumen, where the susceptibility of an oligomer to microbial attack is primarily determined by the oligomer's solubility in ruminal fluids.

The oligomers described herein contain residues of α-amino acids. A typical α-amino acid has a chemical formula (1):

$$R_1R_2C(NH_2)(COOH), \qquad (1)$$

wherein $R_1$ is hydrogen, hydrocarbyl, substituted hydrocarbyl or heterocyclo, and $R_2$ is hydrogen. Preferably, the α-amino acids are selected from residues of any of the naturally occurring amino acids in proteins. These naturally occurring amino acids in proteins include alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine. More preferably, the α-amino acids include the residue(s) of one or more essential amino acids, i.e., lysine, methionine, histidine, threonine, isoleucine, leucine, tryptophan, valine, phenylalanine and arginine.

Oligomers that are formed from the amino acids of formula (1) may be described as having a formula (2):

$$(AA)_n, \qquad (2)$$

wherein AA is a residue of an α-amino acid, and n is at least 2. The value n may be assessed as an average value in a mixture that contains a plurality of different oligomers. The oligomer material may be prepared and used as a dimer, trimer, tetramer, pentamer, hexamer, septamer, octamer, nonamer, decamer, etc., or as a mixture of such oligomers. Typically n is less than 20.

Amino acid residues that form the oligomer chain are preferably in the form of naturally occurring amino acid residues. The use of chemically substituted amino acids may have undesirable results, such as is observed where HMB-polylysine is not digested by the activity of many proteases. Even so, in some embodiments hereunder the oligomer may be chemically or enzymatically modified to attach to another moiety, for example, through the carboxy terminus of the α-amino acid residue.

The α-amino acid may be the residue of an α-amino acid having the D configuration, the L configuration, or from a racemic or other mixture of the D and L isomers. It is generally preferred that the α-amino acid be the residue of an α-amino acid having the L configuration.

The terms "hydrocarbon" and "hydrocarbyl" as used in the present invention describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Preferably, these moieties comprise 1 to 20 carbon atoms.

The "substituted hydrocarbyl" moieties described herein are hydrocarbyl moieties which are substituted with at least one atom other than carbon, including moieties in which a carbon chain atom is substituted with an atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, keto, acyl, acyloxy; nitro, amino, amido, nitro, cyano, and thiol.

The alkyl groups described herein as substituents are preferably lower alkyl containing from one to six carbon atoms in the principal chain and up to 20 carbon atoms. The alkyl groups may be straight or branched chain and include methyl, ethyl, propyl, isopropyl, butyl, hexyl and the like.

The alkenyl groups described herein as substituents are preferably lower alkenyl containing from two to six carbon atoms in the principal chain and up to 20 carbon atoms. The alkenyl groups may be straight or branched chain and include ethenyl, propenyl, isopropenyl, butenyl, isobutenyl, hexenyl, and the like.

The alkynyl groups described herein as substituents are preferably lower alkynyl containing from two to six carbon atoms in the principal chain and up to 20 carbon atoms. The alkynyl groups may be straight or branched chain and include ethynyl, propynyl, butynyl, isobutynyl, hexynyl, and the like.

The terms "aryl" or "ar" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

The terms "halogen" or "halo" as used herein alone or as part of another group refer to chlorine, bromine, fluorine, and iodine.

The terms "heterocyclo" or "heterocyclic" as used herein alone or as part of another group denote optionally substituted, fully saturated or unsaturated, monocyclic or bicyclic, aromatic or nonaromatic hydrocarbon groups having at least one heteroatom in at least one ring, and preferably 5 or 6 atoms in each ring. The heterocyclo group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heterocyclo include furyl, thienyl, pyridyl and the like. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, and thiol.

The acyl moieties described herein contain hydrocarbyl, substituted hydrocarbyl or heterocyclo moieties.

The oligomers may be synthesized enzymatically, chemically or biologically. Thus, for purpose of this disclosure, the term "synthetic" means that a component is prepared artificially in order to accomplish certain predetermined purpose. Methods for chemical synthesis of oligomers are generally known in the art, for example, as described generally by Fruton, J. S., Adv. Enzymology, 53, 239-306, 1992. When the oligomer is synthesized enzymatically, the oligomer may be present in a mixture along with the enzyme that is used in the synthesis. When the oligomers are synthesized biologically, the amino acid oligomers may be encoded by a gene or a fragment thereof. The genes may be synthesized or isolated from other organisms. The gene preferably is placed in an expression construct before being introduced into a host organism to be expressed. The expressed amino acid oligomers may be used directly as a feed supplement. More preferably, the expressed amino acid oligomers are isolated and purified before being used as a feed supplement.

The term hydrophobicity refers to the characteristic of a molecule's tendency to repel water or not to absorb water. The overall hydrophobicity of a protein is determined by many factors, such as folding, hydrophobicity of individual amino acids and their interactions. Because the oligomers of the present invention are typically peptides of less than 20 residues, no complex tertiary structure generally exists for peptides of this size. Therefore, the dominant factor in determining hydrophobicity of the oligomers is the hydrophobicity of each amino acid constituents. Hydrophobicity assessments are generally known in the art, for example, as described generally in Kaiser and Kezdy, Peptides with Affinity for Membranes, Annual Review of Biophysics and Biophysical Chemistry Vol. 16: 561-581, 1987.

TABLE 1

Hydrophobicity Index for Common Amino Acids at pH 7*

| Amino acid | | | | | | |
|---|---|---|---|---|---|---|
| Phe | Ile | Trp | Leu | Val | Met | Tyr |

| Hydrophobicity Index | 100 | 99 | 97 | 97 | 76 | 74 | 63 |

| Amino acid | | | | | | |
|---|---|---|---|---|---|---|
| Cys | Ala | Thr | His | Gly | Ser | Gln |

| Hydrophobicity Index | 49 | 41 | 13 | 8 | 0 | −5 | −10 |

| Amino acid | | | | | |
|---|---|---|---|---|---|
| Arg | Lys | Asn | Glu | Pro | Asp |

| Hydrophobicity Index | −14 | −23 | −28 | −31 | −46 | −55 |

*Data is adapted from Monera et al., J. Protein Sci., 1: 319-29, 1995.

Table 1 shows the hydrophobicity index of the 20 amino acids that occur in proteins. The hydrophobicity index is a measure of the relative hydrophobicity, or how soluble an amino acid is in water. The values in Table 1 are measured at pH 7 and are normalized so that the most hydrophobic residue is given a value of 100 relative to glycine, which is considered neutral (0 value). The scale is extrapolated to negative values for residues that are more hydrophilic than glycine. The hydrophobicity index is affected by pH to certain extent, as shown in Table 2:

TABLE 2

Hydrophobicity Index for Common Amino Acids at pH 2*

| Amino acid | | | | | | |
|---|---|---|---|---|---|---|
| Leu | Ile | Phe | Trp | Val | Met | Cys |

| Hydrophobicity Index | 100 | 100 | 92 | 84 | 79 | 74 | 52 |

| Amino acid | | | | | | |
|---|---|---|---|---|---|---|
| Tyr | Ala | Thr | Glu | Gly | Ser | Gln |

| Hydrophobicity Index | 49 | 47 | 13 | 8 | 0 | −7 | −18 |

| Amino acid | | | | | |
|---|---|---|---|---|---|
| Asp | Arg | Lys | Asn | His | Pro |

| Hydrophobicity Index | −18 | −26 | −37 | −41 | −42 | −46 |

*Data is adapted from Sereda et al., J. Chrom.., 676: 139-53, 1994.

It is useful to consider that any amino acid oligomer may be described as having an average hydrophobicity index such that $$AHI = \frac{\sum_{i}^{n} HIi}{n} \quad (3)$$

where AHI is the average hydrophobicity index, HIi is the hydrophobicity index of an amino acid residue i in an oligomer of n such residues. For shorter chain oligomers of less than five to eight residues, it is preferred that AHI is at least 40 at room temperature and neutral pH. AHI is preferably at least 50 and more preferably at least 60.

Solubility of the oligomer is measured as the percentage of oligomer on a dry weight basis that dissolves in a solvent and the total amount of the solvent used. The solvent used is typically water or a water-based solutions. The most preferred solvent is rumen fluid. The amount of oligomers that dissolves in the solvent is determined by subtracting the amount of undissolved oligomer from the total input amount of the oligomer.

Solubility is generally expressed gravimetrically. For example, if 100 grams of a dry oligomer is dissolved in 100 grams of rumen fluid, and 40 grams of the oligomer remains undissolved after extended agitation, the solubility of the oligomer under these circumstances is 60%. The term "soluble" refers to materials that have solubility of 50% or higher, while the term "insoluble" refers to matters that have less than 50% of solubility in any given solvent. Solubility of the oligomers (dry weight basis) may, for example, be 50%, 40%, 30% or less in an equal weight of water. Solvents may be a solution, a suspension or other mixtures suitable for dissolving another substance. For purpose of the present discussion, a solvent does not need to be homogeneous.

An In vitro microbial degradation assay may be conducted in a single-phase fermenter. Rumen fluid is used to inoculate the fermenters into which oligomers of certain amino acids are added. See Meng, Q. et al., Fermentation substrate and dilution rate interact to affect microbial growth and efficiency. J. Anim. Sci. 77:206-214, 1999. Amino acid recovered after incubation is calculated as the ratio of amino acid recovered in the effluent corrected for microbial contribution to the amount of supplemental amino acids that are supplied in the form of an oligomer.

Ruminant feed contains mostly organic materials. Examples of these organic materials may include grass, hay, soyhull, soybean, alfalfa, corn, milo, wheat, silage or any other commercially available feeds appropriate for ruminants. Inorganic materials, such as minerals, may be mixed into the feed to satisfy the need of animals during various stages of growth or lactation.

Supplementation of ruminant diets is commonly done to increase the amount of limiting amino acids. The limiting amino acids are usually essential amino acids that an unsupplemented diet does not contain in sufficient amounts for use in preferred ratios with respect to other amino acids. The ratio of rumen-stable amino acids needed in the diet to meet the limiting amino acid requirements of the animal depends on the primary ingredients of the diet, and most notably upon the grain source. In one such example, a corn-based diet for growing cattle would require a rumen-stable amino acid supply with a ratio of methionine, lysine, histidine and arginine of 1:5:1:6, respectively (Table 3). Where naturally occurring proteins are rumen-stable, a niche-based diet for optimum weight gain and health of the same group of animals would require a rumen-stable amino acid supply with a ratio of methionine, lysine, histidine, threonine, leucine and arginine of 2:4:3:2:8:3, respectively. Due to variance in the protein content of natural food sources, it is difficult or impossible to reliably and repeatably use natural proteins in a program of supplementation to meet these needs. However, this task is relatively simple if the synthetic oligomers described herein are formulated as supplements. For instance, cattle fed with corn or milo have different requirement of amino acids and supplementation should be adjusted accordingly to achieve the same rate of growth (Table 3).

Dairy cattle are expected to respond in like manner with respect to beef cattle when amino acid oligomers are used in diet formulation. Dairy cattle have equal or greater amino acid requirements for milk protein synthesis than do beef calves accruing muscle tissue. Like beef cattle, the dietary ingredients influence the profile of limiting rumen-stable amino acids in the diet. Even so, the amino acid requirement for lactation is different than the amino acid requirement for muscle synthesis, and the dietary need profile changes as lactation stage changes.

TABLE 3

Supplemental amino acids required (g/d) for beef calves to gain 2.3 kg daily when fed a traditional grain (corn or milo) diet with soybean meal added to achieve a 13% crude protein diet.

|  | Corn | Ratio | Milo | Ratio |
| --- | --- | --- | --- | --- |
| Methionine | 3.0 | 1 | 3.5 | 2 |
| Lysine | 13.9 | 5 | 7.3 | 4 |
| Histidine | 3.2 | 1 | 4.8 | 3 |
| Threonine | 0 |  | 3.2 | 2 |
| Leucine | 0 |  | 12.7 | 8 |
| Arginine | 18.1 | 6 | 4.6 | 3 |

Ruminant dietary requirements have been extensively investigated. By way of example, one study demonstrates that lysine is first-limiting and methionine is second-limiting in peak lactation. During mid lactation lysine and methionine are co-limiting, while neither methionine nor lysine is limiting in late lactation. Schwab et al. *Amino Acid Limitation and Flow to Duodenum at Four Stages of Lactation. 1. Sequence of Lysine and Methionine Limitation*. J. Dairy Sci. 75:3486-3502 (1992). Another study demonstrates that the limiting amino acids are methionine, histidine, and arginine; when a lactation diet with a relatively high proportion of forage in the diet is fed, See Xu et al., *The Effect of Ruminal Bypass Lysine and Methionine on Milk Yield and Composition of Lactating Cows*, J. Dairy Sci. 81:1062-77 (1998). This research also demonstrates that rumen-stable amino acids could replace rumen undegradable proteins as a source of limiting amino acids. Another study demonstrates that milk protein yield is increased when rumen-stable amino acids (lysine and methionine) are fed in the diet. Wu et al. *Lactational Performance of Cows Fed Low or High Ruminally Undegradable Protein Prepartum and Supplemental Methionine and Lysine Postpartum*. J. Diary Sci. 80:722-29 (1997).

Depending upon the specific application, the compositions described herein may be fed or otherwise administered orally, or sprayed into the eye, ear or nasal cavity. The oligomer may be applied by rubbing into the skin of the animal. Alternatively, the composition may be injected. The most preferred mode of administration is through oral feeding of the animals.

The following examples illustrate the present invention. These examples are provided for purposes of illustration only and are not intended to be limiting.

Example 1

Oligomerization of methionine and co-oligomerization of MHBA and methionine were performed according to conditions disclosed in S. Arai, M. Yamashita, and M Fujimaki, Agric. Biol. Chem., 43(5), 1069-1074 (1979) and R. Jost, E. Brambilla and J. C. Monti, Helv. Chim. Acta, 63 (1980) 375-384 (1980). The synthesis was carried out with a reaction mixture consisting of 10 g of L-methionine ethyl ester (5 g each in the case of co-oligomerization of L-methionine ethyl ester and HMB ethyl ester) dissolved in 50 ml of nanopure water containing 0.1 mole sodium bicarbonate buffer and 4 mmole L-cysteine set to a pH of 9. The solution was brought up to 100 ml and was then incubated for 24 hrs at 37° C. after 2 g papain was added. The reactions were terminated by thermal denaturation of the enzyme by heating the mixture at 80° C. for 10 minutes.

Figure 2:
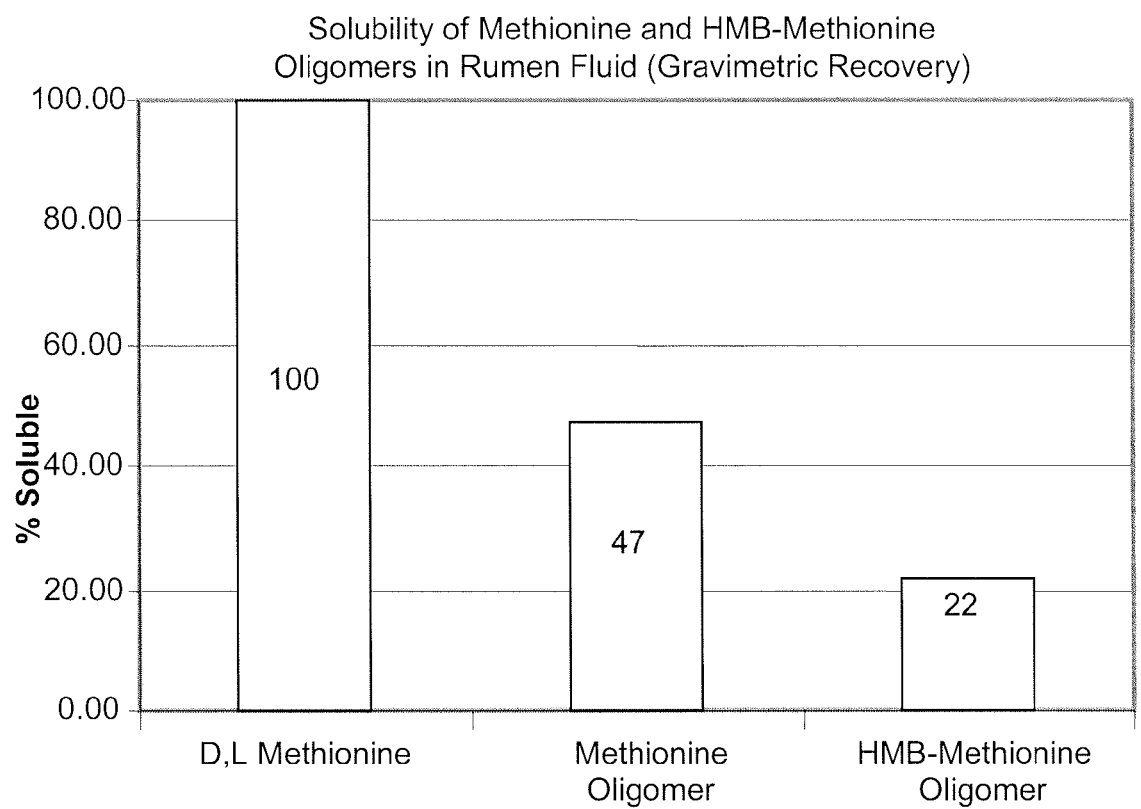
FIG. 2 shows the solubility of methionine and methionine oligomers in rumen fluid as compared to HMB capped methionine oligomer.

Oligomers of poly-methionine with or without an end-capping HMB (for structure, see FIG. 1) were dissolved in rumen fluid obtained using Gravimetric Recovery. Methionine monomers were included in the assay as a control. The solubility of various oligomers was measured by measuring the difference between the amount of oligomer before dissolution and the amount of oligomer that remains undissolved after the rumen fluid was saturated. The solubility of various oligomers are summarized in FIG. 2.

Example 2

Figure 3:
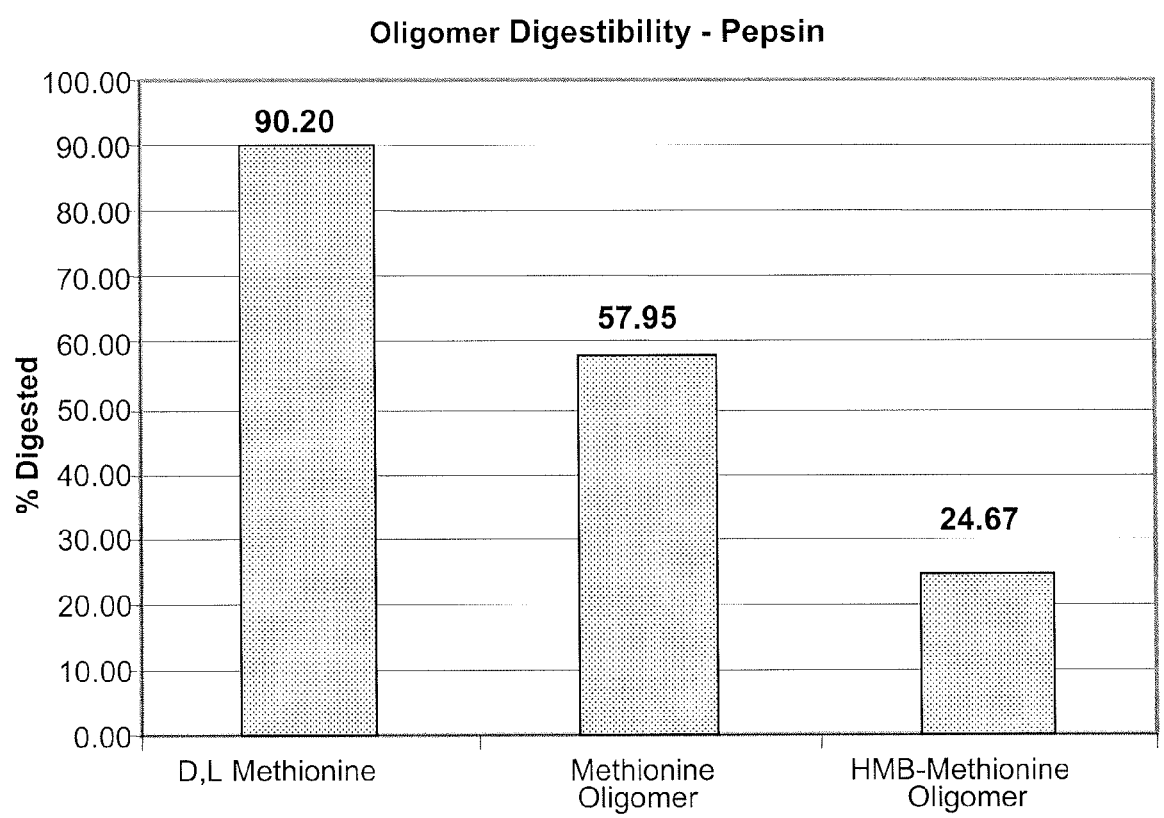
FIG. 3 shows the digestibility of methionine and methionine oligomers by pepsin as compared to HMB capped methionine oligomer.
Figure 4:
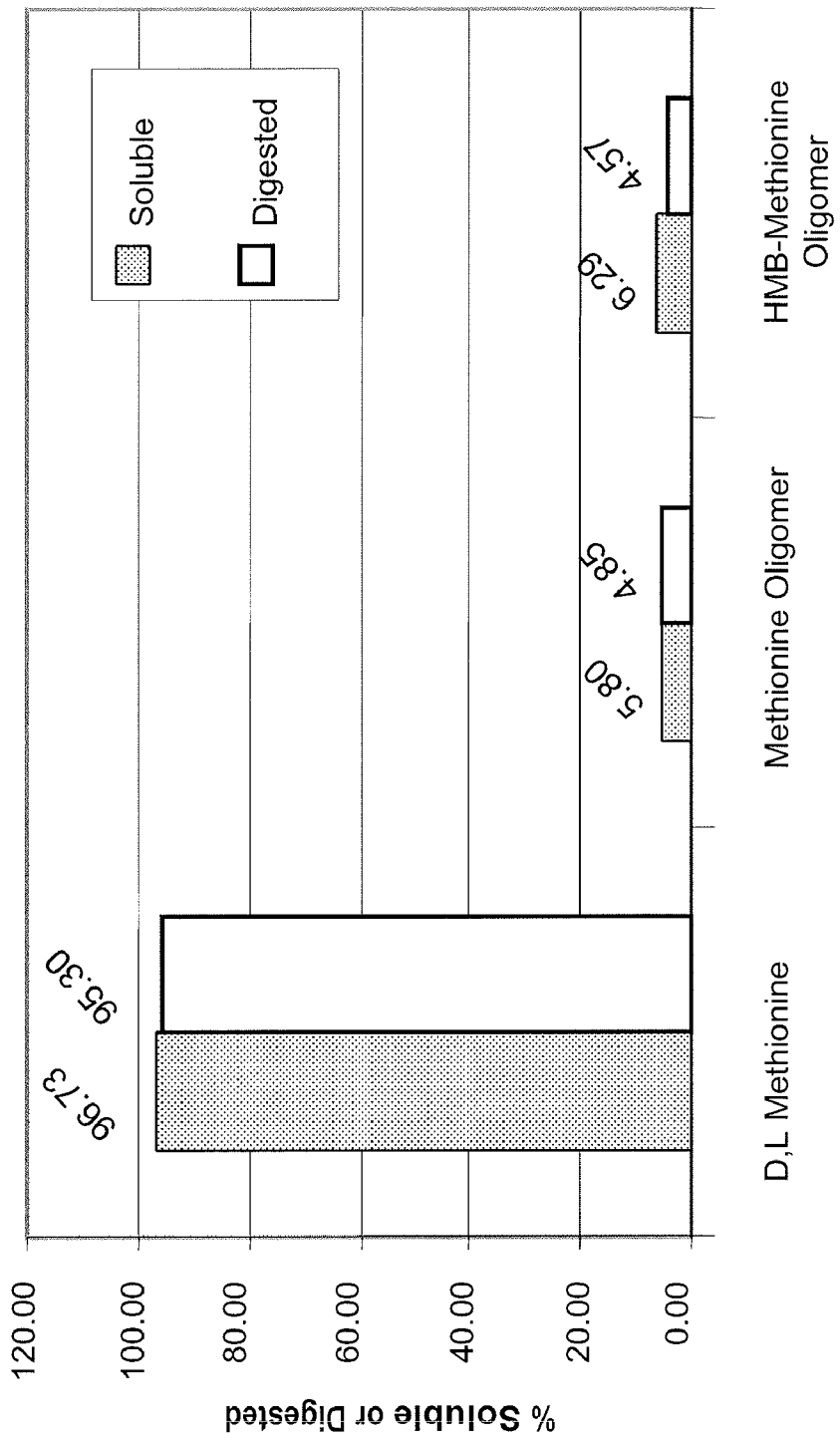
FIG. 4 shows the solubility and digestibility of methionine, methionine oligomers and as compared to HMB capped methionine oligomer after 12 hour incubation with rumen fluid in the presence of microbial enzymes.

Oligomers of poly-methionine with or without an end-capping HMB were synthesized as described in Example 1. The biological release of the amino acids from the oligomers was examined using several digestive enzymes including, pepsin, trypsin, chymotrypsin, intestinal peptidase and carboxypeptidase. The oligomers were dissolved at 10 mg/mL in 0.15 HCl (pH 2.5) or 50 mM KPO4 (pH 7.5). Samples (0.5 mL) were incubated with 10 units of each enzyme for 2 hours at 37° C. The extent of digestion was quantified by measurement of newly released amino groups and their reaction with o-Phthalaldehyde (OPA) and 2,4,6-trinitrobenzene sulfonic acid (TNBSA). Results are summarized below in FIG. 3. These results show that HMB-methionine and poly-methionine both have decreased digestibility be pepsin.

Example 3

Nineteen single-phase fermenters were used in this study. The system and operating conditions have been described previously by Meng et al., *Fermentation substrate and dilution rate interact to affect microbial growth and efficiency*. J. Anim. Sci. 77:206-214 (1999). Rumen fluid used to inoculate the fermenters was obtained from three ruminally cannulated crossbred steers fed a medium quality grass hay supplemented with 2 kg $hd^{-1}$ $d^{-1}$ of a 12% CP grain mixture. The rumen fluid was strained through two layers of cheesecloth and added to the fermenters along with an equal volume of mineral-buffer solution containing 475 mg urea per liter. See Slyter, *Buffers used in the artificial rumen*. In: Proc. Continuous Culture Fermenters: Frustration or Fermentation. In: Proc. Northeastern ADAS-ASAS Regional Mtg., Chazy, N.Y. p 9 (1990). A dilution rate of 4% $hr^{-1}$ was maintained by continuously pumping the mineral-buffer solution into each fermenter.

TABLE 4

Composition of experimental diets fed to continuous culture fermenters.

| | Treatment | | | |
|---|---|---|---|---|
| Ingredient | Control | D, L Met | Met Olig | HMB-Met |
| Soyhulls (g d$^{-1}$) | 45 | 45 | 45 | 45 |
| D,L Methionine (g d$^{-1}$) | | .045 | | |
| Met Oligomer (g d$^{-1}$) | | | .045 | |
| HMB-Methionine Oligomer (g d$^{-1}$) | | | | .045 | g d$^{-1}$: grams per day

Table 4 shows the composition of the diets fed to the continuous culture fermenters. The diets were fed twice daily in 2 equal portions with an interval of about 12 hours. The supplements were added to the diet to maintain a similar ratio between diets and treatments feeding amounts. The experimental period was 7 days with the first 5 days being for acclimation and the final 2 days for total effluent collection.

The effluent was collected daily in an ice bath and the volume was recorded. The daily effluent collection was frozen (−20° C.) until analyses were performed. Effluent for each fermenter was composited over the 2-day sampling period. The pH of the fermenter contents was determined daily 6 hour after feeding using a glass-electrode portable pH meter. For ammonia and volatile fatty acid analysis (VFA), a 5 mL sample was taken 6 hour after feeding on sampling days, acidified with 250 μL of 6N HCL and immediately frozen at −80° C.

For analysis, the samples for ammonia and VFA analysis were thawed and centrifuged at 10,000×g for 20 min. The supernatant was then analyzed for ammonia concentration according to the procedure of Broderick and Kang, *Automated simultaneous determination of ammonia and amino acids in ruminal fluid and in vitro media*. J. Dairy Sci. 33:64-75 (1980). The VFA concentration was determined using a gas chromatogram (Model 3400, Varian, Walnut Creek, Calif.) according to the procedure of Grigsby et al., *Site and extent of nutrient digestion by steers fed a low-quality brome grass hay diet with incremental levels soybean hull substitution*. J. Anim. Sci. 70:1941-1949 (1992). The collected effluent was thawed overnight at 4° C., and centrifuged at 30,000×g for 30 minutes to pellet the feed and bacteria. The pellet was washed with a 0.9% (wt/vol) saline solution, centrifuged at 30,000×g for 30 min. The pellet was rewashed with distilled water, recentrifuged at 30,000×g for 30 min. The resultant pellet was then lyophilized.

At the end of the run, fermenter contents were collected and frozen (−20° C.). To isolate the bacteria from the fermenter contents each fermenter was first thawed overnight at 4° C., and then centrifuged at 1000×g for 5 min. to remove the feed particles. The supernatant was then centrifuged at 30,000×g for 30 min. to pellet the bacteria. The pellet was washed in the same manner as the procedure described above for washing the pellet from the effluent. The washed pellet was then lyophilized.

The diets, effluent, and isolated bacteria were all analyzed for dry matter ("DM") and organic matter ("OM") according to methods described in AOAC—Official Methods of Analysis, 13$^{th}$ ed. Association of Official Analytical Chemists, Washington, D.C. (1984).

Amino acid content and nitrogen were assayed according to Method 982.30 E (a,b,c) of AOAC—Official Methods of Analysis, 14$^{th}$ ed. Association of Official Analytical Chemists, Washington, D.C. (1995), and using Model FP-248 Nitrogen Determinator (LECO, St. Joseph, Mich.), respectively.

The bacteria and effluent were analyzed for RNA content according to the procedure of Zinn and Owens, *A rapid procedure for purine measurement and its use for estimating net ruminal protein synthesis*. Can. J. Anim. Sci. 66:157-166 (1986). Microbial nitrogen flow was calculated as the N:bacterial purine ratio divided by the N:effluent purine ratio and multiplied by the total effluent N flow. Microbial efficiency was expressed as grams of microbial N per kilogram of truly fermented OM. True digestibility of DM and OM was calculated as the difference between the diet fed and effluent residues corrected for microbial contributions. The percentage of supplemental methionine recovered was calculated as the ratio of methionine recovered in the effluent corrected for microbial contribution to the amount of supplemental methionine fed. The data were analyzed using the General Linear Model Procedure (SAS, Inc., Version 8.02, 1999) as a completely randomized design with a P-value of less than 0.05 considered to be significant. Table 5 summarizes the results of the assays described above.

TABLE 5

Fermenter pH, ammonia (NH$_3$) concentration, microbial efficiency, DM and OM digestibility, volatile fatty acid (VFA) concentration and supplemental methionine recovery in the effluent of continuous culture fermenters fed experimental diets.

| | Treatment | | | | |
|---|---|---|---|---|---|
| | Control | D, L Met | Met Olig | HMB-Met | SEM |
| Subject of Measurement | | | | | |
| pH | 6.33$^a$ | 5.90$^b$ | 6.22$^a$ | 6.00$^b$ | 0.08 |
| NH$_3$, mg/dL | 6.11$^a$ | 1.98$^c$ | 3.37$^b$ | 1.50$^c$ | 0.44 |
| MOEFF$^1$ | 9.52 | 9.11 | 7.60 | 7.99 | 1.05 |
| True DM Digestibility | 59.01$^b$ | 65.98$^a$ | 64.71$^a$ | 63.04$^{a,b}$ | 2.05 |
| True OM Digestibility | 62.32 | 68.15 | 66.50 | 65.48 | 2.12 |
| Volatile Fatty Acid, molar % | | | | | |
| Acetate | 73.25 | 73.22 | 73.19 | 72.44 | 0.36 |
| Propionate | 17.16$^b$ | 16.64$^c$ | 17.17$^b$ | 18.13$^a$ | 0.16 |
| Isobutyrate | 0.40 | 0.42 | 0.41 | 0.39 | 0.02 |
| Butyrate | 7.00 | 6.98 | 6.84 | 6.66 | 0.21 |
| Isovalerate | 1.37$^b$ | 1.90$^a$ | 1.48$^b$ | 1.51$^b$ | 0.10 |
| Valerate | 0.81 | 0.84 | 0.91 | 0.87 | 0.05 |

TABLE 5-continued

Fermenter pH, ammonia (NH$_3$) concentration, microbial efficiency, DM and OM digestibility, volatile fatty acid (VFA) concentration and supplemental methionine recovery in the effluent of continuous culture fermenters fed experimental diets.

| | Treatment | | | | |
|---|---|---|---|---|---|
| | Control | D, L Met | Met Olig | HMB-Met | SEM |
| Total VFA Production, mM | 106.61[b] | 131.73[a] | 117.98[a,b] | 129.72[a] | 4.86 |
| Supplemental Methionine Recovered, % | — | 12.25[c] | 45.00[b] | 59.80[a] | 0.04 |

[1]Microbial efficiency is expressed as grams of bacterial nitrogen per kilogram organic matter fermented.
[a,b,c]Means with unlike superscripts are different, $P < 0.05$.

We claim:

1. A feed for ruminants comprising:
a feed base selected from the group consisting of plant matter, animal matter, and combinations thereof,
the feed base providing an amino acid content,
the amino acid content including essential amino acids in a ratio such that there exists a deficiency of at least one limiting essential amino acid which is not present in sufficient amounts in the feed base or is not adsorbed in sufficient amounts by a ruminant to achieve optimal efficiency in amino acid metabolism; and
a synthetic component including at least one oligomer of the formula $(AA)_n$,
wherein each AA is an amino acid independently selected from the group consisting of α-amino acids;
n is at least 2,
said oligomer contains only one type of limiting essential amino acid selected from the group consisting of methionine, histidine, threonine, isoleucine, leucine, tryptophan, valine, phenylalanine, arginine,
said oligomer or mixture of oligomers having solubility of less than 50% determined as the weight of oligomer or oligomers that dissolves in an equal weight of water, and
the synthetic component contains at least one limiting essential amino acid in an amount that at least partially offsets said amino acid deficiency.

2. The feed of claim 1, wherein said oligomer is mixed with an oligomer consisting of polylysine having the formula $(AA)_n$,
wherein AA is lysine and wherein n is at least 2, and
wherein said mixture comprises at least one of said limiting amino acids and lysine in a predetermined ratio.

3. The feed of claim 2 wherein said predetermined ratio is of methionine residues to lysine residues in the range from 1:2 to 1:6.

4. The feed of claim 2 wherein said predetermined ratio is of methionine residues to lysine residues in the range of about 1:2.

5. The feed of claim 2 wherein said predetermined ratio is of methionine residues to lysine residues in the range of about 1:5.

6. A feed for ruminants comprising:
a feed base selected from the group consisting of plant matter, animal matter, and combinations thereof,
the feed base providing an amino acid content,
the amino acid content including essential amino acids in a ratio such that there exists a deficiency of at least one limiting essential amino acid which is not present in sufficient amounts in the feed base or is not adsorbed in sufficient amounts by a ruminant to achieve optimal efficiency in amino acid metabolism; and
a synthetic component including at least one unbranched oligomer of the formula $(AA)_n$,
wherein each AA is an amino acid independently selected from the group consisting of α-amino acids;
n is at least 4,
said oligomer contains a combination of at least two limiting essential amino acids selected from the group consisting of lysine, methionine, histidine, threonine, isoleucine, leucine, tryptophan, valine, phenylalanine, arginine and combinations thereof,
said oligomer having solubility of less than 50% determined as the weight of oligomer that dissolves in equal weight of water, and
the synthetic component contains at least one limiting essential amino acid in an amount that at least partially offsets said amino acid deficiency.

7. The feed of claim 6 wherein the oligomer comprises a combination of limiting essential amino acids including methionine, lysine, histidine and arginine in a predetermined ratio.

8. The feed of claim 7 wherein the ratio of methionine, lysine, histidine and arginine in the oligomer component is about 1:5:1:6.

9. A feed for ruminants comprising:
a feed base selected from the group consisting of plant matter, animal matter, and combinations thereof,
the feed base providing an amino acid content,
the amino acid content including essential amino acids in a ratio such that there exists a deficiency of at least one limiting essential amino acid which is not present in sufficient amounts in the feed base or is not adsorbed in sufficient amounts by a ruminant to achieve optimal efficiency in amino acid metabolism; and
a synthetic component including at least one unbranched oligomer of the formula $(AA)_n$,
wherein each AA is an amino acid independently selected from the group consisting of α-amino acids;
n is at least 6,
said oligomer contains a combination of at least two limiting essential amino acids selected from the group consisting of lysine methionine, threonine, isoleucine, leucine, tryptophan, valine, phenylalanine, arginine and combinations thereof,
said oligomer having solubility of less than 50% determined as the weight of oligomer that dissolves in equal weight of water, and
the synthetic component contains at least one limiting essential amino acid in an amount that at least partially offsets said amino acid deficiency.

10. The feed of claim 9 wherein the oligomer comprises a combination of limiting essential amino acids including methionine, lysine, histidine, threonine, leucine and arginine in a predetermined ratio.

11. The feed of claim 10 wherein the ratio of methionine, lysine, histidine, threonine, leucine and arginine in said oligomer is about 2:4:3:2:8:3.

12. The feed of claim 1, wherein the oligomer component comprises an amino acid sequence selected from the group consisting of SEQ ID NO. 1, SEQ ID NO. 2, SEQ ID NO. 3, SEQ ID NO. 4, SEQ ID NO. 5, SEQ ID NO. 6, SEQ ID NO. 7, SEQ ID NO. 8, SEQ ID NO. 9, SEQ ID NO. 10, SEQ ID NO. 11, SEQ ID NO. 12, SEQ ID NO. 13, SEQ ID NO. 14, SEQ ID NO. 15, SEQ ID NO. 16 and SEQ ID NO. 17.

13. The feed of claim 1 wherein the feed base and the synthetic component are mixed together with one another.

14. The feed of claim 1 wherein the feed base and the synthetic component are provided separately in close physical proximity to one another.

15. The feed of claim 1 wherein the feed base comprises soy material.

16. A method of feeding a ruminant comprising administering to the ruminant the feed of claim 1.

17. The method of claim 16, wherein the step of administering is through oral administration.

18. The method of claim 16, wherein the step of administering is through at least one of oral administration, placement in ear, eye spray, placement in nasal cavity, rubbing through the skin and injection.

19. The method of claim 16 wherein the ruminant is bovine.

20. The method of claim 16 wherein the ruminant is a lactating dairy cow.

21. A feed for ruminants comprising a mixture of organic materials including at least one unbranched oligomer of the formula $(AA)_n$
wherein each AA is an amino acid selected independently from the group consisting of α-amino acids independently of any other α-amino acids;
n is at least 2,
said oligomer having solubility in water or a water-based solution that is lower than 50%.

22. The feed of claim 21 wherein AA is an amino acid selected from the group consisting of essential amino acids.

23. A feed for ruminants comprising:
a feed base selected from the group consisting of plant matter, animal matter, and combinations thereof,
the feed base providing an amino acid content,
the amino acid content including essential amino acids in a ratio such that there exists a deficiency of at least one limiting essential amino acid which is not present in sufficient amounts in the feed base or is not adsorbed in sufficient amounts by a ruminant to achieve optimal efficiency in amino acid metabolism; and
a synthetic component including at least one oligomer of the formula $(AA)_n$,
wherein each AA is an amino acid independently selected from the group consisting of α-amino acids;
n is at least 4,
said oligomer contains only one type of limiting essential amino acid selected from the group consisting of methionine, histidine, threonine, isoleucine, leucine, tryptophan, valine, phenylalanine, arginine,
said oligomer or mixture of oligomers having solubility of less than 50% determined as the weight of oligomer or oligomers that dissolves in an equal weight of water, and
the synthetic component contains at least one limiting essential amino acid in an amount that at least partially offsets said amino acid deficiency.

24. The feed of claim 23, wherein said oligomer is mixed with an oligomer consisting of polylysine having the formula $(AA)_n$,
wherein AA is lysine and wherein n is at least 4, and
wherein said mixture comprises at least one of said limiting amino acids and lysine in a predetermined ratio.

25. The feed of claim 24 wherein the oligomer comprises a combination of limiting essential amino acids including methionine, lysine, histidine and arginine in a predetermined ratio.

26. The feed of claim 25 wherein the ratio of methionine, lysine, histidine and arginine in the oligomer component is about 1:5:1:6.

27. A feed for ruminants comprising:
a feed base selected from the group consisting of plant matter, animal matter, and combinations thereof,
the feed base providing an amino acid content,
the amino acid content including essential amino acids in a ratio such that there exists a deficiency of at least one limiting essential amino acid which is not present in sufficient amounts in the feed base or is not adsorbed in sufficient amounts by a ruminant to achieve optimal efficiency in amino acid metabolism; and
a synthetic component including at least one oligomer of the formula $(AA)_n$,
wherein each AA is an amino acid independently selected from the group consisting of α-amino acids;
n is at least 6,
said oligomer contains only one type of limiting essential amino acid selected from the group consisting of methionine, histidine, threonine, isoleucine, leucine, tryptophan, valine, phenylalanine, arginine,
said oligomer or mixture of oligomers having solubility of less than 50% determined as the weight of oligomer or oligomers that dissolves in an equal weight of water, and
the synthetic component contains at least one limiting essential amino acid in an amount that at least partially offsets said amino acid deficiency.

28. The feed of claim 27, wherein said oligomer is mixed with an oligomer consisting of polylysine having the formula $(AA)_n$,
wherein AA is lysine and wherein n is at least 6, and
wherein said mixture comprises at least one of said limiting amino acids and lysine in a predetermined ratio.

29. The feed of claim 28 wherein the oligomer comprises a combination of limiting essential amino acids including methionine, lysine, histidine, threonine, leucine and arginine in a predetermined ratio.

30. The feed of claim 29 wherein the ratio of methionine, lysine, histidine, threonine, leucine and arginine in said oligomer is about 2:4:3:2:8:3.

31. The feed of claim 2 wherein the feed base and the synthetic component are mixed together with one another.

32. The feed of claim 2 wherein the feed base and the synthetic component are provided separately in close physical proximity to one another.

33. The feed of claim 2 wherein the feed base comprises soy material.

34. A method of feeding a ruminant comprising administering to the ruminant the feed of claim 2.

35. The method of claim 31, wherein the step of administering is through oral administration.

36. The method of claim 31, wherein the step of administering is through at least one of oral administration, placement in ear, eye spray, placement in nasal cavity, rubbing through the skin and injection.

37. The method of claim 31 wherein the ruminant is bovine.

38. The method of claim 31 wherein the ruminant is a lactating dairy cow.

39. A feed for ruminants comprising:
  a feed base selected from the group consisting of plant matter, animal matter, and combinations thereof,
  the feed base providing an amino acid content,
  the amino acid content including essential amino acids in a ratio such that there exists a deficiency of at least one limiting essential amino acid which is not present in sufficient amounts in the feed base or is not adsorbed in sufficient amounts by a ruminant to achieve optimal efficiency in amino acid metabolism; and
a synthetic component including at least one unbranched oligomer of the formula $(AA)_n$,
  wherein each AA is an amino acid independently selected from the group consisting of α-amino acids;
  n is at least 2,
  said oligomer contains a combination of at least two limiting essential amino acids selected from the group consisting of lysine, methionine, histidine, threonine, isoleucine, leucine, tryptophan, valine, phenylalanine, arginine and combinations thereof,
  said oligomer having solubility of less than 50% determined as the weight of oligomer that dissolves in equal weight of water, and
  the synthetic component contains at least one limiting essential amino acid in an amount that at least partially offsets said amino acid deficiency.

40. The feed of claim 39, wherein said combination comprises methionine and lysine in a predetermined ratio.

41. The feed of claim 40 wherein said predetermined ratio is of methionine residues to lysine residues in the range from 1:2 to 1:6.

42. The feed of claim 40 wherein said predetermined ratio is of methionine residues to lysine residues in the range of about 1:2.

43. The feed of claim 40 wherein said predetermined ratio is of methionine residues to lysine residues in the range of about 1:5.

* * * * *

SEQUENCE LISTING

<160> NUMBER OF SEQ ID NOS: 17

<210> SEQ ID NO 1
<211> LENGTH: 4
<212> TYPE: PRT
<213> ORGANISM: Artificial
<220> FEATURE:
<223> OTHER INFORMATION: Artificial amino acid oligomer

<400> SEQUENCE: 1

Met Met Met Met
1

<210> SEQ ID NO 2
<211> LENGTH: 5
<212> TYPE: PRT
<213> ORGANISM: Artificial
<220> FEATURE:
<223> OTHER INFORMATION: Artificial amino acid oligomer

<400> SEQUENCE: 2

Met Met Met Met Met
1               5

<210> SEQ ID NO 3
<211> LENGTH: 6
<212> TYPE: PRT
<213> ORGANISM: Artificial
<220> FEATURE:
<223> OTHER INFORMATION: Artificial amino acid oligomer

<400> SEQUENCE: 3

Met Met Met Met Met Met
1               5

<210> SEQ ID NO 4
<211> LENGTH: 7
<212> TYPE: PRT
<213> ORGANISM: Artificial
<220> FEATURE:
<223> OTHER INFORMATION: Artificial amino acid oligomer

<400> SEQUENCE: 4

Met Met Met Met Met Met Met
1               5

<210> SEQ ID NO 5
<211> LENGTH: 8
<212> TYPE: PRT
<213> ORGANISM: Artificial

```
<220> FEATURE:
<223> OTHER INFORMATION: Artificial amino acid oligomer

<400> SEQUENCE: 5

Met Met Met Met Met Met Met Met
1               5

<210> SEQ ID NO 6
<211> LENGTH: 9
<212> TYPE: PRT
<213> ORGANISM: Artificial
<220> FEATURE:
<223> OTHER INFORMATION: Artificial amino acid oligomer

<400> SEQUENCE: 6

Met Met Met Met Met Met Met Met Met
1               5

<210> SEQ ID NO 7
<211> LENGTH: 10
<212> TYPE: PRT
<213> ORGANISM: Artificial
<220> FEATURE:
<223> OTHER INFORMATION: Artificial amino acid oligomer

<400> SEQUENCE: 7

Met Met Met Met Met Met Met Met Met Met
1               5                   10

<210> SEQ ID NO 8
<211> LENGTH: 11
<212> TYPE: PRT
<213> ORGANISM: Artificial
<220> FEATURE:
<223> OTHER INFORMATION: Artificial amino acid oligomer

<400> SEQUENCE: 8

Met Met Met Met Met Met Met Met Met Met Met
1               5                   10

<210> SEQ ID NO 9
<211> LENGTH: 12
<212> TYPE: PRT
<213> ORGANISM: Artificial
<220> FEATURE:
<223> OTHER INFORMATION: Artificial amino acid oligomer

<400> SEQUENCE: 9

Met Met Met Met Met Met Met Met Met Met Met Met
1               5                   10

<210> SEQ ID NO 10
<211> LENGTH: 13
<212> TYPE: PRT
<213> ORGANISM: Artificial
<220> FEATURE:
<223> OTHER INFORMATION: Artificial amino acid oligomer

<400> SEQUENCE: 10

Met Met Met Met Met Met Met Met Met Met Met Met Met
1               5                   10

<210> SEQ ID NO 11
<211> LENGTH: 14
<212> TYPE: PRT
<213> ORGANISM: Artificial
<220> FEATURE:
<223> OTHER INFORMATION: Artificial amino acid oligomer
```

```
<400> SEQUENCE: 11

Met Met Met Met Met Met Met Met Met Met Met Met Met
1               5                   10

<210> SEQ ID NO 12
<211> LENGTH: 15
<212> TYPE: PRT
<213> ORGANISM: Artificial
<220> FEATURE:
<223> OTHER INFORMATION: Artificial amino acid oligomer

<400> SEQUENCE: 12

Met Met Met Met Met Met Met Met Met Met Met Met Met Met Met
1               5                   10                  15

<210> SEQ ID NO 13
<211> LENGTH: 16
<212> TYPE: PRT
<213> ORGANISM: Artificial
<220> FEATURE:
<223> OTHER INFORMATION: Artificial amino acid oligomer

<400> SEQUENCE: 13

Met Met Met Met Met Met Met Met Met Met Met Met Met Met Met Met
1               5                   10                  15

<210> SEQ ID NO 14
<211> LENGTH: 17
<212> TYPE: PRT
<213> ORGANISM: Artificial
<220> FEATURE:
<223> OTHER INFORMATION: Artificial amino acid oligomer

<400> SEQUENCE: 14

Met Met Met Met Met Met Met Met Met Met Met Met Met Met Met Met
1               5                   10                  15

Met

<210> SEQ ID NO 15
<211> LENGTH: 18
<212> TYPE: PRT
<213> ORGANISM: Artificial
<220> FEATURE:
<223> OTHER INFORMATION: Artificial amino acid oligomer

<400> SEQUENCE: 15

Met Met Met Met Met Met Met Met Met Met Met Met Met Met Met Met
1               5                   10                  15

Met Met

<210> SEQ ID NO 16
<211> LENGTH: 19
<212> TYPE: PRT
<213> ORGANISM: Artificial
<220> FEATURE:
<223> OTHER INFORMATION: Artificial amino acid oligomer

<400> SEQUENCE: 16

Met Met Met Met Met Met Met Met Met Met Met Met Met Met Met Met
1               5                   10                  15

Met Met Met
```

```
<210> SEQ ID NO 17
<211> LENGTH: 20
<212> TYPE: PRT
<213> ORGANISM: Artificial
<220> FEATURE:
<223> OTHER INFORMATION: Artificial amino acid oligomer

<400> SEQUENCE: 17

Met Met Met Met Met Met Met Met Met Met Met Met Met Met Met
1               5                   10                  15

Met Met Met Met
            20
```